Aug. 26, 1969
E. R. GARRISON
3,463,541
CAB-OVER TELESCOPIC CAMPER WITH SLIDING PANEL
Filed June 26, 1968
3 Sheets-Sheet 1
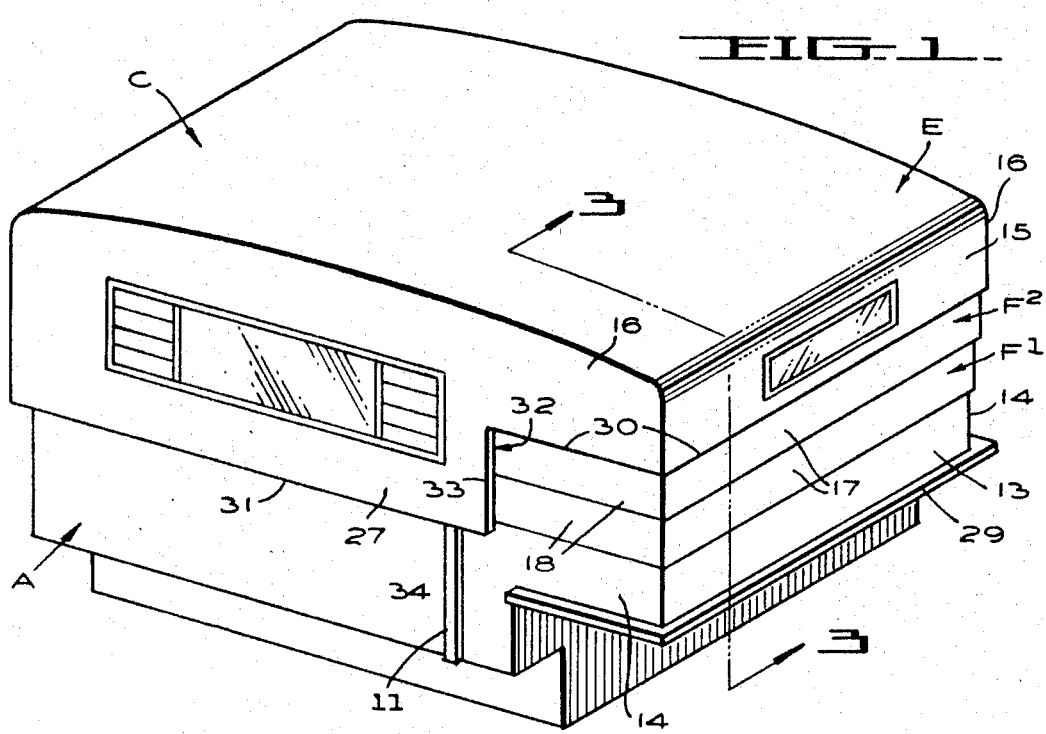
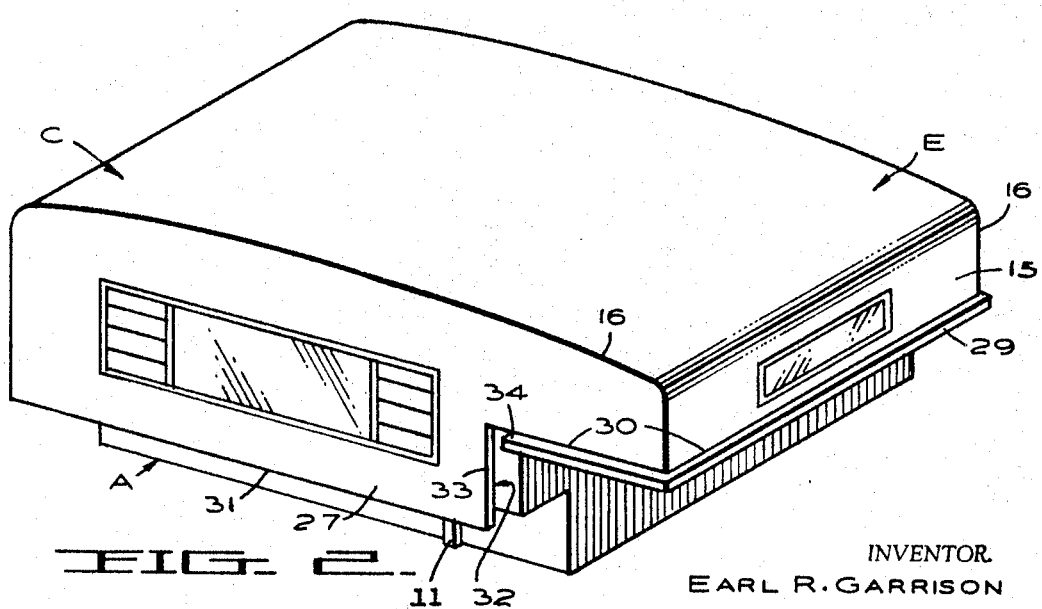
INVENTOR.
EARL R. GARRISON
BY Joseph F. Cole
ATTORNEY

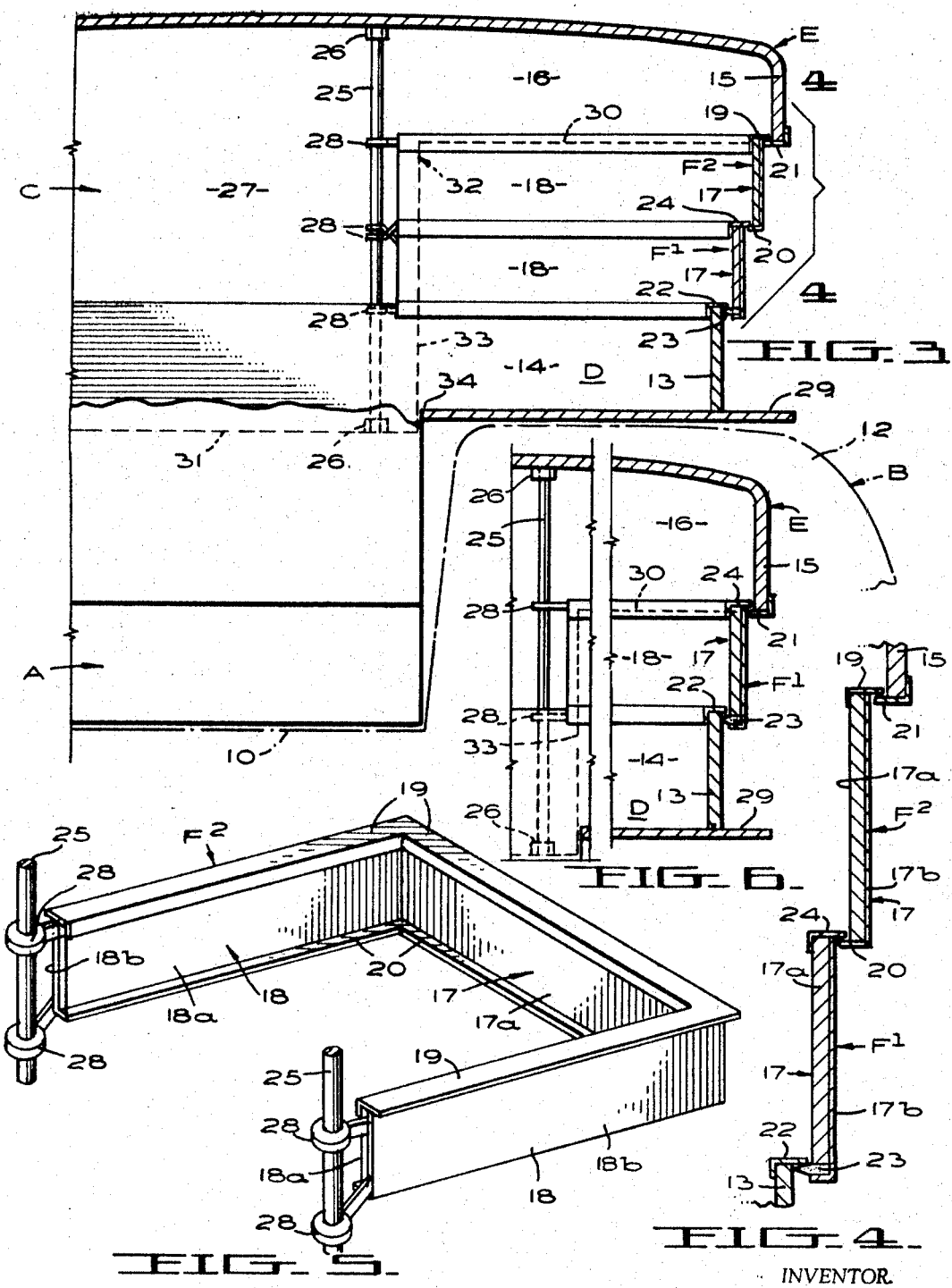

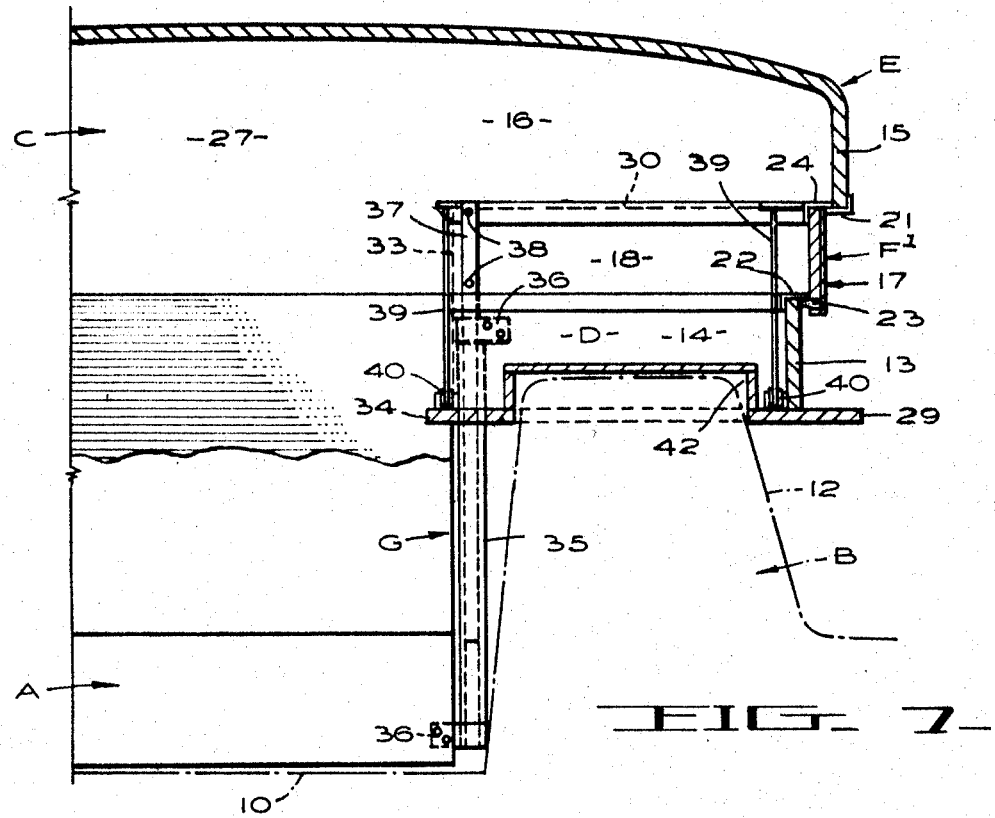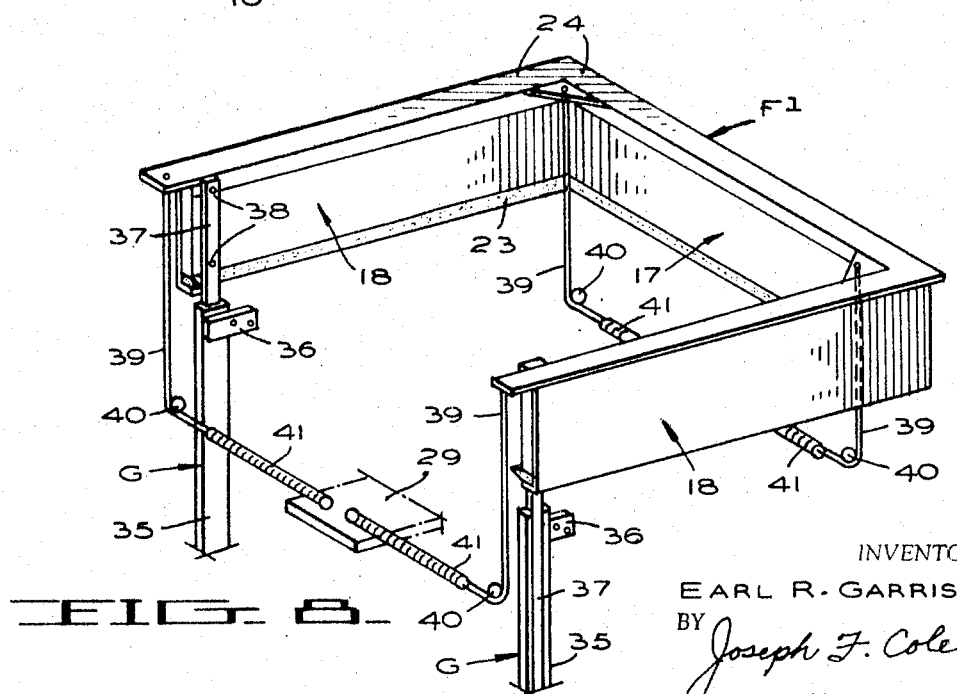

United States Patent Office 3,463,541
Patented Aug. 26, 1969

3,463,541
CAB-OVER TELESCOPIC CAMPER WITH SLIDING PANEL
Earl R. Garrison, 1445 Bellevue Ave.,
Burlingame, Calif. 94010
Continuation-in-part of application Ser. No. 597,346, Nov. 28, 1966. This application June 26, 1968, Ser. No. 744,252
Claims priority, application Canada, Aug. 22, 1967, 998,362
Int. Cl. B60p 3/32; E04b 1/343
U.S. Cl. 296—23        5 Claims

ABSTRACT OF THE DISCLOSURE

A cab-over telescopic camper with sliding panel and having a lower room section mountable on a load-carrying platform of a truck, with an upper room section telescopically arranged on the lower room section and being movable into raised position relative to the lower room section for occupying and into lowered position relative thereto for travelling. The upper and lower room sections are provided with cab-over cover and cab-over compartment, respectively, that overlie the cab of the truck. At least one sliding panel is provided having a transverse front panel part and a pair of spaced longitudinal side wing panel parts extending rearwardly from the front transverse panel part, the sliding panel being made to bridge the space between the lower room section and the upper room section when the latter is raised.

Cross reference to related application

This application is a continuation-in-part application of my copending case for "Cab-Over Telescopic Camper," Ser. No. 597,346, filed on Nov. 28, 1966, now abandoned which related to improvements over my copending application, Ser. No. 585,646, filed Oct. 10, 1966 now Patent No. 3,397,009.

Summary

As the cardinal object of the invention, it is proposed to provide a lower room section that has a cab-over compartment projecting forwardly therefrom to overlie the cab of the truck, and an upper room section that has a cab-over cover extending forwardly over the compartment. Moreover, when the upper room section is raised for occupying, the cover will be spaced above the compartment, and one or more sliding panels are provided for bridging the space between the walls of the compartment and the cover so as to provide a weather-proof arrangement.

Also, when the upper room section is raised, the sliding panel or panels will be elevated into bridging position, and this is preferably done automatically. When the upper room section is lowered into travelling position, the panel or panels are automatically lowered into out-of-the-way locations. Each sliding panel has a transverse front panel part and a pair of longitudinal side wing panel parts, preferably forming a unitary structure.

Brief description of the drawings

For a better understanding of the invention, reference should be had to the accompanying drawings, forming part of this specification, in which:

FIG. 1 is an isometric view of my cab-over telescopic camper with sliding panels in occupying position;

FIG. 2 is an isometric view showing the upper room section lowered into travelling position;

FIG. 3 is a longitudinal sectional view taken along the vertical plane 3—3 of FIG. 1;

FIG. 4 is a fragmentary sectional view of that portion of FIG. 3 enclosed by bracket 4—4 on an enlarged scale;

FIG. 5 is an isometric view of one of the sliding panels;

FIG. 6 is a fragmentary sectional view corresponding to FIG. 3, but showing a single sliding panel;

FIG. 7 is a longitudinal sectional view similar to FIG. 3, but illustrating modifications; and FIG. 8 is an isometric view of the sliding panel and associate mechanism shown in FIG. 7.

Description of the preferred embodiments

Referring to the drawings in detail, I have shown a cab-over telescopic camper having a lower room section designated generally at A arranged for mounting on a load-carrying platform 10 of a truck B (see FIG. 3). Moreover, an upper room section C is telescopically arranged on the lower room section A and is movable into raised position relative to the lower room section for occupying (see FIGS. 1 and 3) and into lowered position relative thereto for travelling (see FIG. 2). Suitable guides 11 may be provided on the lower room section A for guiding the upper room section C for up and down movements. Any suitable means (not shown) may be utilized for raising and lowering the upper room section, which is well known in the art.

The lower room section A is provided with a cab-over compartment D (see FIG. 3) that is fixed thereto and projecting forwardly therefrom to overlie the cab 12 of the truck, this compartment having a transverse front wall 13 and a pair of longitudinal side walls 14 (see FIGS. 1, 3 and 4).

The upper room section C is provided with a cab-over cover E fixed thereto and projecting forwardly therefrom to overlie the cab-over compartment D, and this cover is movable up and down with the upper room section. This cover has a transverse front wall 15 and a pair of longitudinal side walls 16 that are movable into spaced relation above the transverse front wall 13 and the longitudinal side walls 14, respectively, of the cab-over compartment when the upper room section C is raised (see FIGS. 1 and 3).

It will be noted that a pair of sliding panels $F^1$ and $F^2$ are movable into position to bridge the space between the front transverse walls 13 and 15 of the compartment D and the cover E, respectively, when the latter is raised. These same panels will bridge the space between the longitudinal side walls 14 and 16 of the compartment D and the cover E upon raising the latter. Of course, a single panel could be used for this purpose, providing that it had sufficient height. Accordingly, the expression of "at least one sliding panel" has been used in the appended claims.

As the specification continues, it will be apparent that I provide means that are operable to automatically move the sliding panel or panels into bridging position when the upper room section C is raised, and to free the panel or panels for downward movement into out-of-the-way position when the upper room section C is lowered into travelling position.

Inasmuch as the sliding panels $F^1$ and $F^2$ are substantially identical, with the exception of dimensions, a description of one will suffice for both. Each has a front transverse panel part 17 and a pair of spaced longitudinal side wing panel parts 18 (see FIGS. 1, 3, 4 and 5). These sliding panels (or panel) are guided for vertical movement in the manner hereinafter described, and are substantially confined to the region above the cab 12 of the truck B. Moreover, the upper and lower room sections C and A, respectively, have main longitudinal side walls disposed rearwardly of the cab 12 of the truck B that overlap one another when the upper room section is arranged in either raised or lowered positions, as clearly disclosed in FIGS. 1 and 2, and the longitudinal side wing panel parts 18 extend rearwardly so as to overlap the main longitudinal side walls 27 of the upper room section when this room section is raised or lowered.

The front transverse panel part 17 and the side wing parts 18 are disposed between the walls of the compartment D and the cab-over cover E when the latter is lowered into travelling position, as in FIG. 2.

It is preferable that the inner surfaces of the front transverse panel part 17 be made from wood 17a that is covered on its exterior surface by a sheet of metal 17b (see FIG. 4). In a like manner, the longitudinal side wing panel parts 18 may have wood 19a on their interior surfaces that is covered by sheets of metal 18b on the exterior (see FIG. 5).

The upper and lower edges of the transverse panel part 17 of the sliding panel $F^2$ and the longitudinal side wing panel parts 18 of this same panel are provided with upper and lower flanges 19 and 20, respectively, that project therefrom (see FIGS. 3, 4 and 5). The transverse front wall 15 and the longitudinal side walls 16 of the cab-over cover are provided with a projecting flange 21 disposed to engage with the upper flange 19 of the sliding panel $F^2$ so as to lift this panel into bridging position and seal thereagainst when the upper room section C is raised into occupying position (see FIGS. 3 and 4).

The transverse front wall 13 and the longitudinal side walls 14 of the cab-over compartment D are provided with a projecting flange 22 disposed to engage with a resilient lower flange 23 on the sliding panel $F^1$ so as to seal thereagainst when the upper room section C is raised into occupying position. The resilient flange 23 further bears against the front and side walls 13 and 14, respectively, of the compartment D.

The front transverse panel part 17 and the side wing panel parts 18, together with their respective flanges, define a unitary structure for each of the sliding panels $F^1$ and $F^2$.

Moreover, the panel $F^1$ has a projecting flange 24 at its top that extends along the front transverse panel part 17 and the side wing panel parts 18 of this panel, which is engaged by the lower flange 20 of the panel $F^2$ when the latter is raised. Thus the raising of the panel $F^2$ will raise the panel $F^1$. The panel $F^2$ is disposed above the panel $F^1$ when the cab-over cover E is elevated.

In order to retain the panels $F^1$ and $F^2$ in weather-proof contact with one another as these panels are moved up and down, a pair of vertical guide rods 25 are secured by brackets 26 to the longitudinal side walls 27 of the upper room section C, and bearing brackets 28 are secured to these panels and are slidably mounted on rods 25, see FIGS. 3 and 5.

The lower room section A has a plate 29 secured thereto that forms a bottom wall for the compartment D and that overlies the cab 12 of the truck B. The transverse front wall 15 and the longitudinal side walls of the cab-over cover have lower edges 30 arranged above the lower edges 31 of the upper room section C, and the lower edges 30 are movable against the plate 29 when the upper room section C is lowered into travelling position (see FIG. 2). In other words, notches 32 are fashioned in the side walls 16 and 27 of the upper room section to receive the plate 29 when this room section is lowered. Side wing panel parts 18 of the sliding panels extend rearwardly so as to overlap the longitudinal side walls 27 of the upper room section C so as to fully cover these notches when the cab-over cover E is raised. The vertical edges 33 of these notches substantially abut the rear edge 34 of the plate 29.

As the upper room section C is lowered from the position shown in FIG. 3, the coacting flanges 19 and 21 will support the upper panel $F^2$ against twisting out of alignment, and at the same time the coacting flanges 20 and 24 will support the lower panel $F^1$ from twisting out of alignment.

Referring now to the modification shown in FIG. 6, this embodiment corresponds to FIG. 3, excepting for the fact that only a single sliding panel $F^1$ has been disclosed. Like reference numerals have been applied to corresponding parts.

Turning now to the embodiment of the invention shown in FIGS. 7 and 8, which forms the subject matter of the continuation-in-part matter, it will be noted that a single sliding panel $F^1$ has been disclosed therein in the same manner as previously described in connection with FIG. 6. However, the vertical guide rods 25, brackets 26 and bearing brackets 28 have been omitted from FIGS. 7 and 8, and have been replaced by a pair of vertically-extendable guides G.

Each guide G consists of a guideway 35 that is secured by brackets 36 to the outer surfaces of the side walls of the lower room section A, with slide bars 37 being disposed in these guideways for vertical sliding movements. The upper ends of the slide bars 37 are secured by screws 38, or other suitable fastening means, to the inner rear surfaces of the longitudinal side wing parts 19 of the sliding panel $F^1$. This arrangement will maintain the front transverse walls 13 and 17 in weather-proof relation as the panel $F^1$ is moved up and down, and will prevent the panel from twisting out of alignment. Of course, ball bearings (not shown) may be interposed between the guide ways 35 and the slide bars 37.

For the purpose of yieldingly urging the sliding panel $F^1$ downwardly, cables 39 have been anchored to the upper rear and front portions of the longitudinal side wing panel parts 18. These cables pass around pulleys 40 that may be supported by the plate 29. The lower ends of these cables are secured to tension springs 41 at the outer ends of the latter, while the inner ends of these springs are suitably anchored in place, such as to the plate 29 as shown in FIG. 8. Thus, when the panel $F^1$ is free to descend as the cab-over cover E is lowered, the cables 39 and the springs 41 will pull this panel downwardly without causing the latter to twist out of alignment, and there will be no binding action.

As a further structural feature, it will be noted from FIG. 7 that a recessed compartment 42 has been provided in the plate 29 that extends upwardly from the latter and is dimensioned to receive and fit over the top portion of the cab 12 of the truck B. This arrangement will result in further lowering the height of the upper room section C when the latter is lowered into travelling position.

I claim:

1. In a cab-over telescopic camper with sliding panel for mounting on a load-carrying platform of a truck, the latter being provided with a cab, wherein the improvement comprises:
    (a) a lower room section mountable on the load-carrying platform of the truck;
    (b) an upper room section telescopically arranged on the lower room section, and being movable into raised position relative to the lower room section for occupying and into lowered position relative thereto for travelling;
    (c) the lower room section being provided with a cab-over compartment fixed thereto and projecting forwardly therefrom to overlie the cab of the truck, this compartment having a transverse front wall and a pair of spaced longitudinal side walls;
    (d) the upper room section being provided with a cab-over cover fixed thereto and projecting forwardly therefrom to overlie the cab-over compartment, and this cover being movable up and down with the upper room section;
    (e) the cab-over cover having a transverse front wall and a pair of spaced longitudinal side walls that are movable into spaced relation above the transverse front wall and the longitudinal side walls, respectively, of the cab-over compartment;
    (f) at least one vertically slidable panel having a front transverse panel part and a pair of spaced longitudinal side wing panel parts extending rearwardly from the front transverse panel part;

(g) the slidable panel being located and movable into position so that its front transverse panel part will bridge the space between the transverse walls of the compartment and the cover when the latter is raised;

(h) the longitudinal side wing panel parts being located and movable into position to bridge the space between the longitudinal side walls of the compartment and the cover when the latter is raised;

(i) the slidable panel being substantially confined to the region above the cab of the truck;

(j) the upper and lower room sections having main longitudinal side walls disposed rearwardly of the cab of the truck that overlap one another when the upper room section is arranged in either raised or lowered positions, and the longitudinal side wing panel parts extending rearwardly so as to overlap said main longitudinal side walls of the upper room section when this room section is raised or lowered;

(k) and means operable to automatically move the sliding panel into bridging position when the upper room section is raised, and to free the panel for downward movement when the upper room section is lowered.

2. The cab-over telescopic camper with sliding panel, as set forth in claim 1;

(1) and in which the front transverse panel part and the side wing panel parts define a unitary structure.

3. The cab-over telescopic camper with sliding panel, as set forth in claim 1;

(1) and in which a pair of vertically-extendable guides are provided, each guide consisting of a guideway that is secured to the side walls of the lower room section and having a slide bar disposed in the guideway for vertical sliding movement, the upper ends of the slide bars being secured to the rear portions of the longitudinal side wing parts of the sliding panel.

4. The cab-over telescopic camper with sliding panel, as set forth in claim 3;

(m) and in which yielding means are attached to the sliding panel near the front and rear thereof, and operable to pull the panel downwardly when the latter is free to move in that direction.

5. The cab-over telescopic camper with sliding panel, as set forth in claim 1;

(1) and in which the lower room section has a plate secured thereto at the bottom of the cab-over compartment, the plate defining a marginal portion surrounding and disposed below the top of said cab and against which said cover may be lowered;

(m) the plate being provided with a recessed compartment extending upwardly therefrom, and this recessed compartment receiving and fitting over the top portion of the cab of the truck to thereby lower the height of the upper room section above the roadway when the latter room section is lowered into travelling position until said cover rests on said marginal portion of the plate.

References Cited
UNITED STATES PATENTS

| | | | |
|---|---|---|---|
| 3,356,407 | 12/1967 | McGarry | 296—27 X |
| 3,321,233 | 5/1967 | Davis | 296—23 |
| 3,143,121 | 8/1964 | McKee | 296—23 X |

PHILIP GOODMAN, Primary Examiner

U.S. Cl. X.R.
52—66; 296—26